(12) United States Patent
McDonald, II et al.

(10) Patent No.: US 7,219,950 B2
(45) Date of Patent: May 22, 2007

(54) SLIDING DOOR ASSEMBLY

(75) Inventors: Ernest M. McDonald, II, Osceola, IN (US); Eugene A Dylewski, II, Granger, IN (US); John E Knudtson, Granger, IN (US)

(73) Assignee: Utilimaster Corporation, Wakarusa, IN (US)

( * ) Notice: Subject to any disclaimer, the term of this patent is extended or adjusted under 35 U.S.C. 154(b) by 0 days.

(21) Appl. No.: 11/081,462

(22) Filed: Mar. 16, 2005

(65) Prior Publication Data

US 2005/0206195 A1 Sep. 22, 2005

Related U.S. Application Data

(60) Provisional application No. 60/553,514, filed on Mar. 16, 2004.

(51) Int. Cl.
*B60J 5/06* (2006.01)
(52) U.S. Cl. .......................................... 296/155; 49/123
(58) Field of Classification Search ................ 296/155, 296/146.1; 49/366, 370, 409, 116, 119, 120, 49/121
See application file for complete search history.

(56) References Cited

U.S. PATENT DOCUMENTS

| | | | | |
|---|---|---|---|---|
| 4,050,191 A | * | 9/1977 | Azuma | 49/360 |
| 4,142,326 A | * | 3/1979 | Schmitz | 49/123 |
| 4,152,870 A | * | 5/1979 | Knap | 49/123 |
| 4,190,927 A | | 3/1980 | Hepperle | |
| 4,259,810 A | * | 4/1981 | West | 49/123 |
| 4,457,108 A | * | 7/1984 | Kuschel et al. | 49/213 |
| 4,781,270 A | * | 11/1988 | Holland | 49/120 |
| 4,901,474 A | * | 2/1990 | Bayard et al. | 49/280 |
| 5,148,631 A | * | 9/1992 | Bayard et al. | 49/370 |
| 5,247,763 A | * | 9/1993 | Hein | 49/123 |
| 5,659,160 A | * | 8/1997 | Tracey | 49/123 |
| 5,701,973 A | * | 12/1997 | Tracey | 49/121 |
| 5,711,112 A | * | 1/1998 | Barten et al. | 49/123 |
| 5,730,254 A | * | 3/1998 | Nguyen | 187/335 |
| 5,878,846 A | * | 3/1999 | O'Donnell | 187/318 |
| 6,032,416 A | * | 3/2000 | Springer et al. | 49/118 |
| 6,761,206 B2 | | 7/2004 | Newman | |
| 6,918,210 B1 | * | 7/2005 | Smiley | 49/360 |
| 2005/0210752 A1 | * | 9/2005 | Schulte | 49/360 |

* cited by examiner

*Primary Examiner*—Kiran B. Patel
(74) *Attorney, Agent, or Firm*—Barnes & Thornburg LLP (57) ABSTRACT

A vehicle door assembly is provided. The door assembly is located on vehicle and includes at least first and second doors each movable between open and closed positions. A door slide assembly is coupled to the vehicle and comprises a traversing segments assembly. The traversing segments assembly includes first and second segments which are movable in first and second directions. The first door is coupled to the first segment and the second door is coupled to the second segment. Movement of the first door causes movement of the first segment in the first direction which causes movement of the second door in the second direction between open and closed positions.

8 Claims, 13 Drawing Sheets

SLIDING DOOR ASSEMBLY

RELATED APPLICATIONS

The present application is related to and claims priority to U.S. Provisional Patent Application, Ser. No. 60/553,514, filed on Mar. 16, 2004, entitled SLIDING DOOR ASSEMBLY. The subject matter disclosed in that provisional application is hereby expressly incorporated into the present application by reference.

TECHNICAL FIELD

The present disclosure relates generally to vehicles and, particularly, to door assemblies for use on a vehicle.

BACKGROUND AND SUMMARY

Access doors on vehicles such as delivery vehicles are well known. Such doors conventionally use roll-up type, hinged or single sliding doors. For a myriad of reasons, such doors may not be the most suitable design for an operator. For example, most delivery vehicles employ a roll-up type cargo door so the vehicle can be backed up directly to a loading dock without, first, having to open the door. Conventional hinged or single sliding doors like those used on mini-vans are not suitable for such activity. Roll-up type doors, however, have the disadvantage of being cumbersome to operate, latch and lock. Often, the roll-up doors carry water and contaminants into the storage compartment when rolled-up causing potential harm to the cargo. It would, thus, be beneficial to provide a door assembly that provides the advantages of roll-up type doors, while eliminating the disadvantages.

Accordingly, one embodiment of the present disclosure provides a vehicle comprising a door assembly and a door slide assembly. The door assembly is located on the vehicle and comprises first and second doors. The first and second doors are movable between open and closed positions relative to the vehicle. The door slide assembly is coupled to the vehicle and comprises a traversing segments assembly. The traversing segments assembly comprises first and second segments which are movable in first and second directions. The first door is coupled to the first segment and the second door is coupled to the second segment. Movement of the first door causes movement of the first segment in the first direction which causes movement of the second door in the second direction between open and closed positions.

The above and other illustrative embodiments may also comprise: movement of the first door causing movement of the first segment in the second direction causing movement of the second door in the first direction; the door slide assembly further comprising first and second brackets, wherein the first bracket being coupled to the first door and the first segment of the traversing segments assembly, and wherein the second bracket being coupled to the second door and the second segment of the traversing segments assembly; movement in the first direction being axially opposite movement in the second direction such that when a force is applied to the first segment of the traversing segments assembly in the first direction, the second segment is moved in the axially opposite second direction; the first segment of the traversing segments assembly being spaced apart from and movable substantially parallel to the second segment of the traversing segments assembly; the traversing segment assembly comprising a cord having coupled ends and drawn about at least one pulley wheel, wherein the cord comprises the first and second segments such that as the first segment moves in the first direction, the second segment is moved in the second direction; and a first force being applied to the first door which moves the first segment in the first direction which moves the second segment in the second direction moving both the first and second doors to an open position, and wherein a second force being applied to the first door which moves the first segment in the second direction moves the second segment in the first direction moving both the first and second doors to a closed position.

Another illustrative embodiment of the present disclosure provides a vehicle comprising first and second doors, and a movable member assembly. The first and second doors are movable with respect to each other. The movable member assembly comprises first and second members each movable in first and second directions. The first member is movable in the first direction when the second member is movable in the second direction. The first door is also coupled to and movable with the first member and the second door is coupled to and movable with the second member. Accordingly, movement of the first door in the first direction moves the second door in the second direction.

The above and other illustrative embodiments may also comprise: movement of the first door in the second direction moves the second door in the first direction; the first and second doors each being attached to a respective rail, wherein each rail being movable along a longitudinally extending track; the movable member assembly comprising a cord having coupled ends and drawn between a plurality of pulley wheels, and wherein the cord forms the first and second members such that as the first member moves in the first direction, the second member is moved in the second direction; a bracket coupled to the first door and attached to the first member to move the door in the first direction when the first member is moved in the first direction, and a second bracket coupled to the second door and attached to the second member to move the door in the second direction when the second member is moved in the second direction; and a first force being applied to the first door that moves the first member in the first direction which moves the second member in the second direction moving both the first and second doors to an open position, and wherein a second force is applied to the first door, it moves the first member in the second direction which moves the second member in the first direction moving both the first and second doors to a closed position.

Another illustrative embodiment of the present disclosure provides a vehicle which comprises first and second doors and a pulley system. The first and second doors are each movable with respect to each other. The pulley system comprises first and second spaced apart pulley wheels, and a pulley cord disposed about each of the pulley wheels defining a first side and second side of the pulley system. Movement of the pulley cord on the first side in a first direction moves the pulley cord on the second side in a second direction. The first door is coupled to the pulley cable on the first side and the second door is coupled to the pulley cable on the second side. Accordingly, movement of the first door moves the pulley cord on the first side in the first direction causing the pulley cord on the second side to move in the second direction to move the second door in the second direction.

The above and other illustrative embodiments may also comprise: movement of the first door in the second direction moves the second door in the first direction; the first and second doors are each attached to a respective rail, wherein each rail is movable long a longitudinally extending track; a first force being applied to the first door which moves the first side of the cable moving the cable in first direction which moves the second side of the cable in the second direction moving both the first and second doors to an open position, and wherein a second force is applied to the first door to move the first side of the cable in the second direction which moves the second side of the cable in the first direction moving both the first and second doors to a closed position.

Another illustrative embodiment of the present disclosure provides a vehicle comprising first and second doors each movable with respect to each other between open and closed positions; a means for moving the first door to the open position; and a means for moving the second door to the open position as the first door is moved to the open position.

The above and other illustrative embodiments may also comprise a means for moving the first door to the closed position and a means for moving the second door to the closed position as the first door is moved to the closed position.

Another illustrative embodiment of the present disclosure provides a vehicle comprising a plurality of doors such that a force applied to one of the plurality of doors moves the door engages at least one other of the plurality of doors to cause the other of the plurality of doors to move as well, for opening and closing the doors.

Additional features and advantages of the vehicle door assembly will become apparent to those skilled in the art upon consideration of the following detailed description of the illustrated embodiment exemplifying the best mode of carrying out the vehicle door assembly as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the vehicle door assembly, and such exemplification is not to be construed as limiting the scope of the vehicle door assembly in any manner.

DETAILED DESCRIPTION OF THE DRAWINGS

Figure 1:
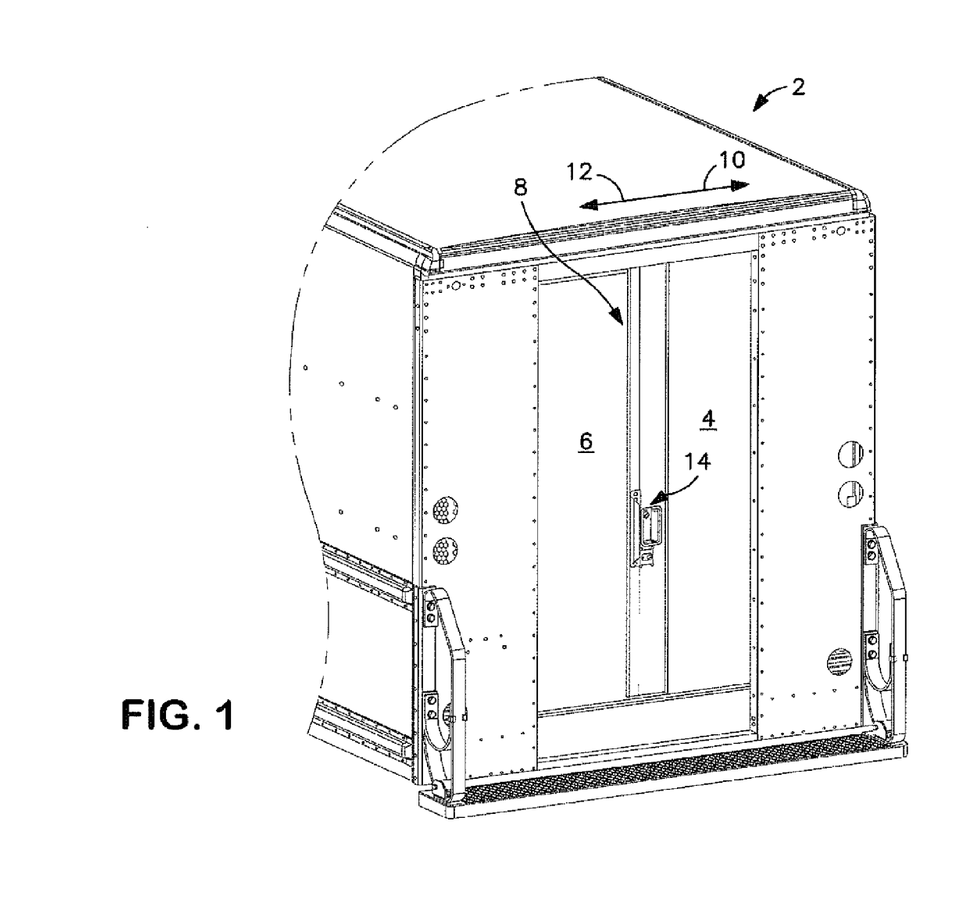
FIG. 1 is a rear perspective view of a vehicle showing an illustrative embodiment of a sliding door assembly in the closed position.

A rear perspective view of an illustrative delivery vehicle 2 is shown in FIG. 1. Doors 4 and 6 are located at the rear of vehicle 2, are in the closed position 8, and are configured to slideably move in directions 10 and 12. The illustrative delivery vehicle 2 shown is configured to carry objects such as parcels, equipment, or supplies. It is appreciated that doors, such as doors 4 and 6, can be employed on other vehicles as well. Door 4 illustratively comprises a handle 14 configured to serve as a grip for an operator. It is appreciated that alternative embodiments of handle 14 may also serve as the latch and/or lock. It is further appreciated that handle 14 may be affixed to door 6, as opposed to, or in addition to, door 4, as alternative embodiments.

Figure 2:
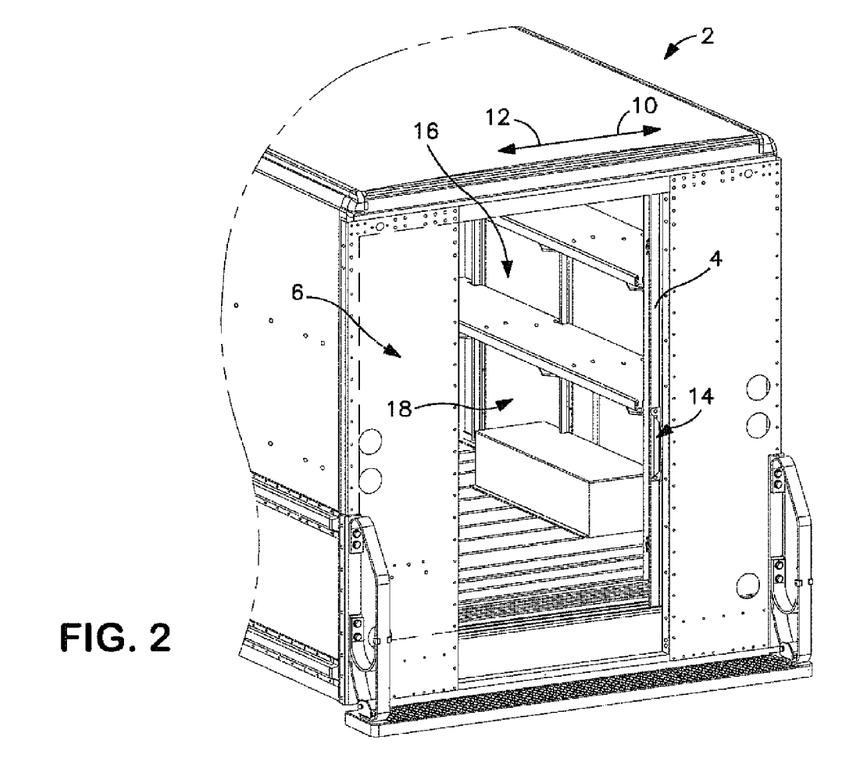
FIG. 2 is another rear perspective view of a portion of the vehicle of FIG. 1, showing the illustrative sliding doors in an open position.

Another rear perspective view of vehicle 2 is shown in FIG. 2. This view shows doors 4 and 6 located in the open position 16. (See also, FIG. 3.) Opening doors 4 and 6 allow access to a storage compartment 18 of vehicle 2. As can be seen by comparing FIG. 1 and FIG. 2, doors 4 and 6 can be moved between open and closed positions without extending outwardly from the vehicle 2. This matches the advantage that roll-up type doors have by allowing the vehicle to back up to a loading dock without the need for clearance for the doors.

Figure 3:
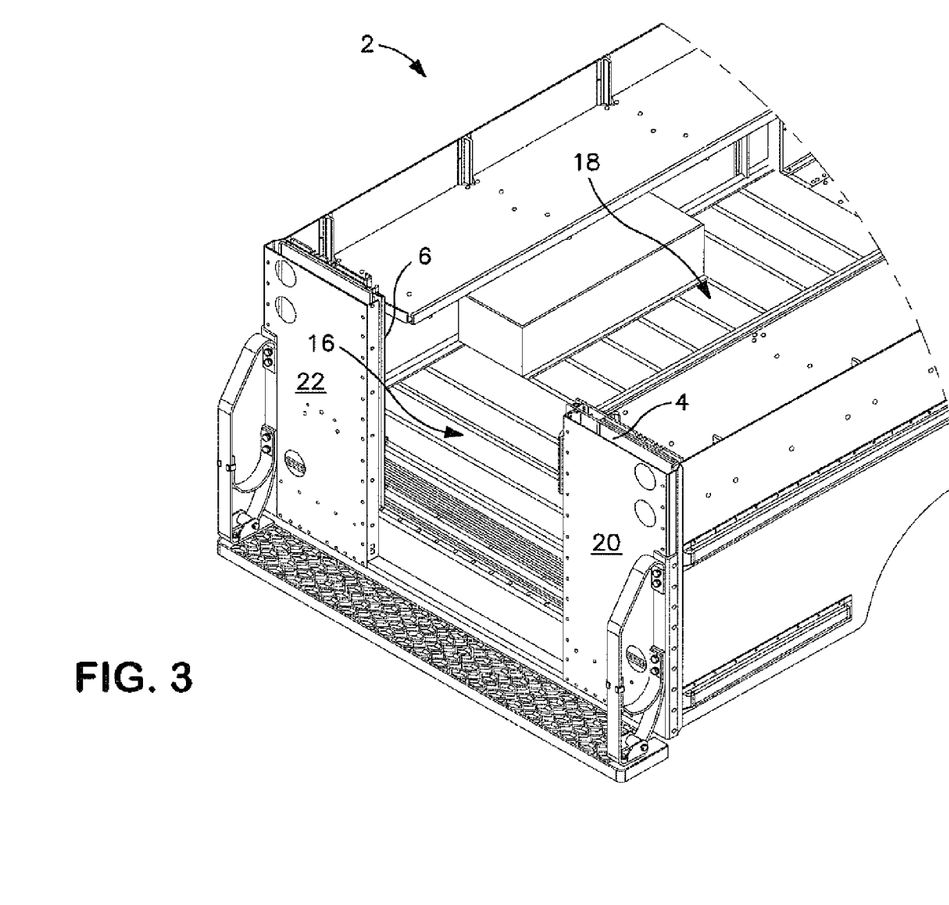
FIG. 3 is a partially cut-away top-rear perspective view of the vehicle showing the illustrative door assembly in the open position.

A partially cut-away, top-rear perspective view of vehicle 2, depicting doors 4 and 6 in open position 16, along with the interior storage compartment 18, is shown in FIG. 3. In the illustrative embodiment, doors 4 and 6 move generally parallel to rear walls 20 and 22, respectively. It is appreciated that the doors 4 and 6 and rear walls 20 and 22 can be of any size useful for the particular vehicle intended. It is further appreciated that in alternative embodiments doors 4 and 6 can be laterally movable in other directions with respect to vehicle 2.

Figure 4:
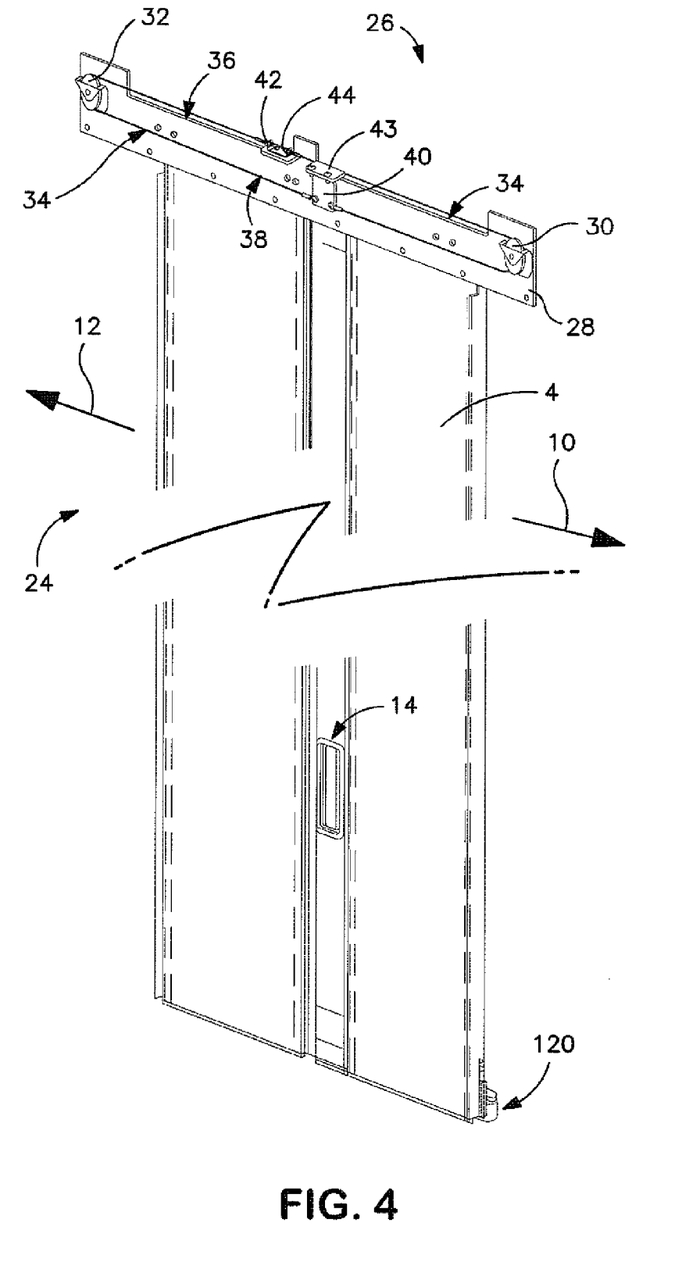
FIG. 4 is a perspective view of the sliding door assembly of FIGS. 1–3, shown in the closed position.

A detailed perspective view of a portion of sliding door assembly 24 is shown in FIG. 4. In this view doors 4, 6 are located in the closed position, similar to that shown in FIG. 1. Assembly 24 comprises doors 4 and 6, as previously discussed, along with traversing segments or door slide assembly. In an illustrative embodiment such an assembly can be a guide pulley assembly 26. Guide pulley assembly 26 comprises a mounting bracket 28 that is illustratively attached to vehicle 2. Cable pulleys 30 and 32 are illustratively located near opposite ends of bracket 28. A cable or cables 34 are strung between pulleys 30 and 32, forming a top cable portion 36 and a lower cable portion 38. Illustratively, door 4 is attached to the lower cable portion 38 via brackets 40 and 43, wherein bracket 43 reaches over the top cable portion 36 and attaches to bracket 40. It is appreciated, however, that bracket 43 may be located under top cable portion 36. In either case, bracket 40 is fastened to the lower cable portion 38 of cable 36. Conversely, door 6 is attached to brackets 42 and 44, wherein bracket 44 attached to the top cable portion 36 of cables 34.

Doors 4 and 6 being coupled to pulley system 26 results in lower cable portion 38 moving door 4 in direction 10, for example, which causes movement of the cables 34 as a whole to move, which causes door 6, coupled to top cable portion 36, to move in the opposite direction 12. Because both doors are attached to cables 34, as one door moves, so too does the other door. However, as door 4 moves in direction 10, door 6 is caused to move in the opposite direction 12. This is how both doors 4 and 6 may open or close with only one door being acted on by the operator. Accordingly, if door 4 is moved in direction 12 towards closed position 8, then the lower cable portion 38 is caused to move in the opposite direction 10 and, thus, door 6 as well.

It is appreciated that the illustrative embodiment of the traversing segments assembly shown herein is the pulley assembly 26. It is appreciated, however, that alternative embodiments may comprise other movable member assemblies, such as a lead screw assembly, rack and pinion assembly, and gear assembly, or a cam assembly, all of which may, or may not, be used with a powered assist such as electrical, pneumatic, or fluid power supplies, for example.

Figure 5:
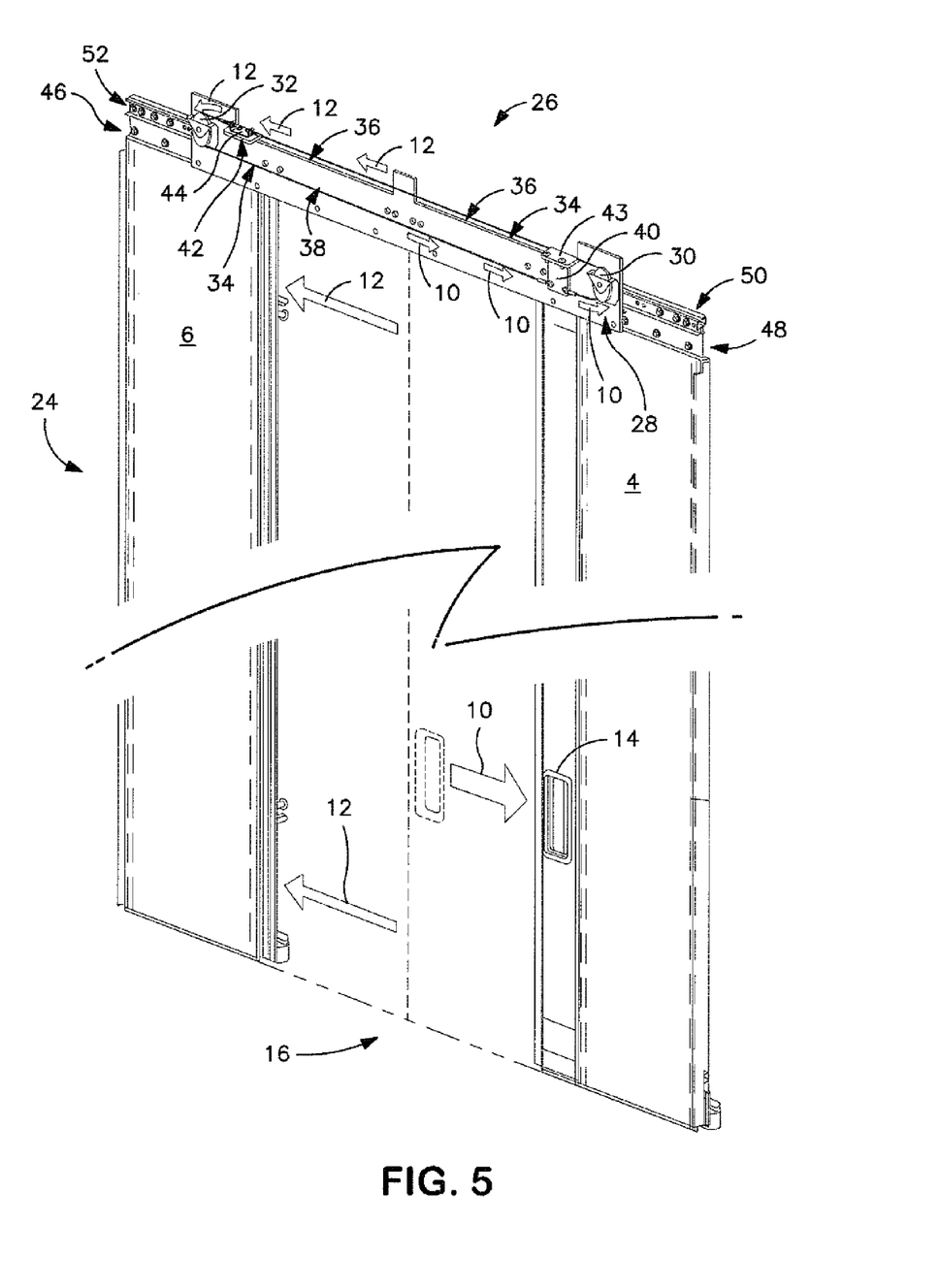
FIG. 5 is a perspective view of the illustrative door assembly of FIG. 4 shown moving toward the open position.

Another detail perspective view of a portion of assembly 24 is shown in FIG. 5. In this view, door 4 is moving in direction 10 toward the open position. This movement illustratively causes lower cable portion 38 to move in direction 10 as well, and move brackets 40 and 43 closer to pulley 30. Since cable 34 wraps around pulley 30 in this embodiment, as the lower cable portion 38 moves in direction 10, top cable portion 36 moves in direction 12, moving brackets 42 and 44 toward pulley 32. As a consequence, door 6 moves in direction 12 concurrent with the movement of bracket 44 as door 4 moves in direction 10 concurrent with movement of bracket 42. Also shown in this view are brackets 46 and 48 attached to doors 6 and 4, respectively. These brackets 46 and 48 illustratively include a first door rail 52 and 50 attached thereto, respectively. These rails 50 and 52 ride bracket track or tracks 54 which are attached to mounting bracket 28. (See, also, FIG. 10.)

Figure 6:
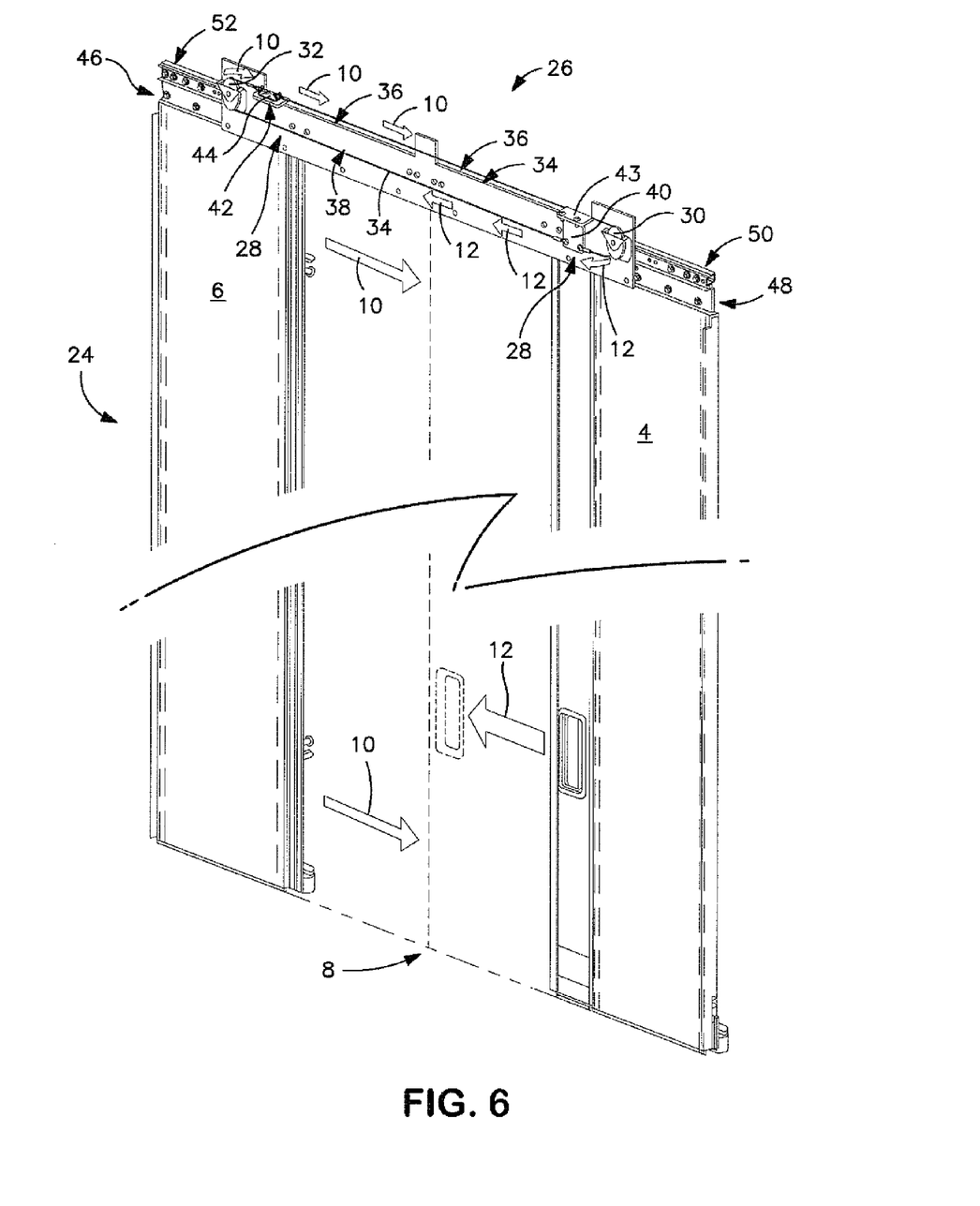
FIG. 6 is a perspective view of the illustrative door assembly of FIG. 4 shown moving toward the closed position.

Another detail view of a portion of assembly 24 is shown in FIG. 6. In this view, door 4 is moving in direction 12 toward closed position 8. This movement illustratively causes brackets 40 and 43 to move in direction 12, causing lower cable portion 38 to also move in direction 12. Consequently, top cable portion 36 moves in direction 10. Movement of top cable portion 36 in direction 10 causes brackets 42 and 44 to move in direction 10 as well. This movement causes door 6 to move in direction 10 to join door 4 in the closed position.

Figure 7:
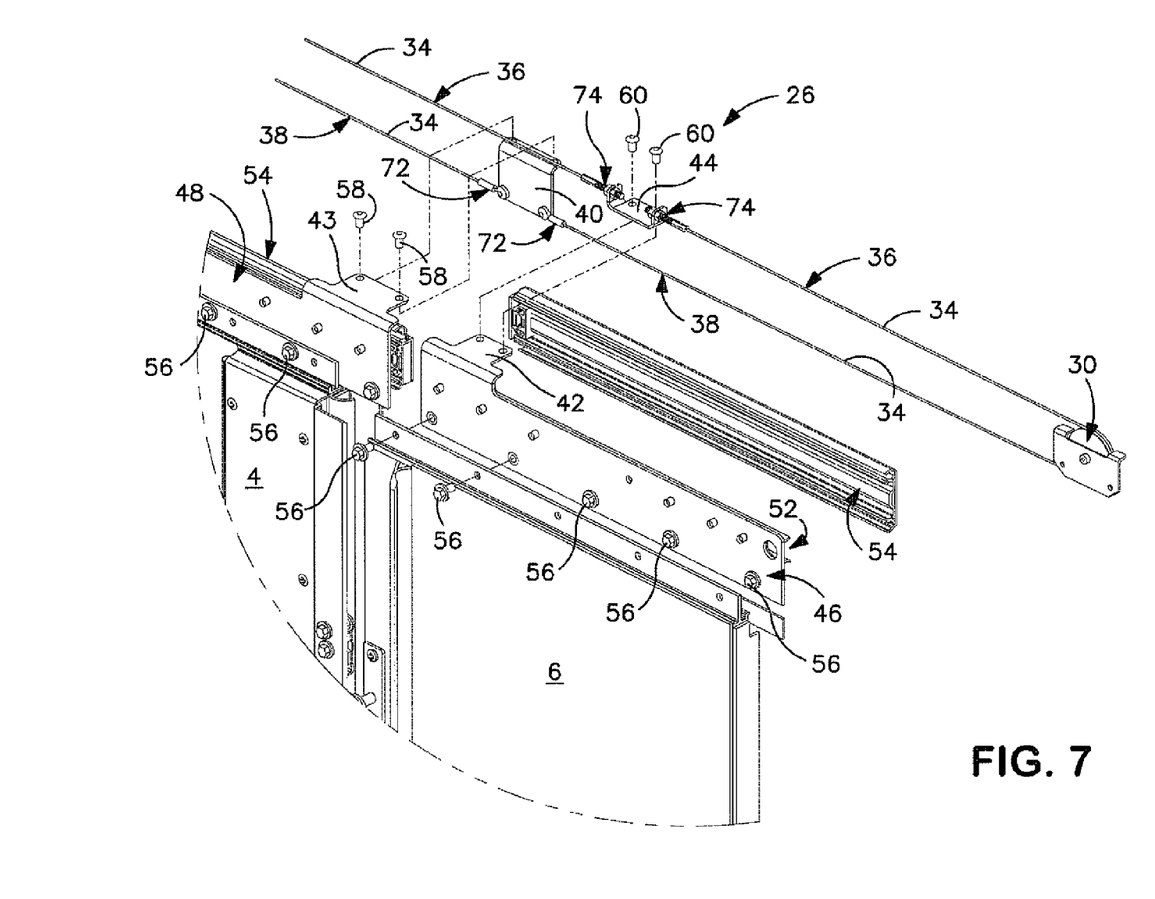
FIG. 7 is a detail exploded view of a portion of the sliding door assembly.

A detailed exploded perspective view of a portion of sliding door assembly 24 is shown in FIG. 7. This view shows the attachment of several of the illustrative structures of the upper portions of doors 4 and 6. Note that this view is an opposite perspective of that shown in FIGS. 4 through 6. Bracket 48 is illustratively attached to door 4 via fasteners 56, as shown. Bracket 43, extending from bracket 48, is illustratively bent or formed to position over bracket track 54, as well as bracket 28. (See, also, FIG. 5.) Bracket 43 attaches to bracket 40 via fasteners 58. This arrangement allows clearance of mounting bracket 28 while attached to lower cable portion 38. In this illustrative embodiment, the bracket 43 is positioned below the top cable portion 36.

Similarly, bracket 46 is attached to door 6 via fasteners 56, as shown. In contrast to door 4, door 6 is attached to the top cable portion 36, and bracket 42 is attached to bracket 44 via fasteners 60. Bracket track 54 is illustratively attached to mounting bracket 28 with the door tracks slideably engagable therewith allowing lateral movement of doors 4 and 6. As shown in FIG. 7, second door rail 52 engages bracket track 54 and is attached to bracket 46.

Figure 8:
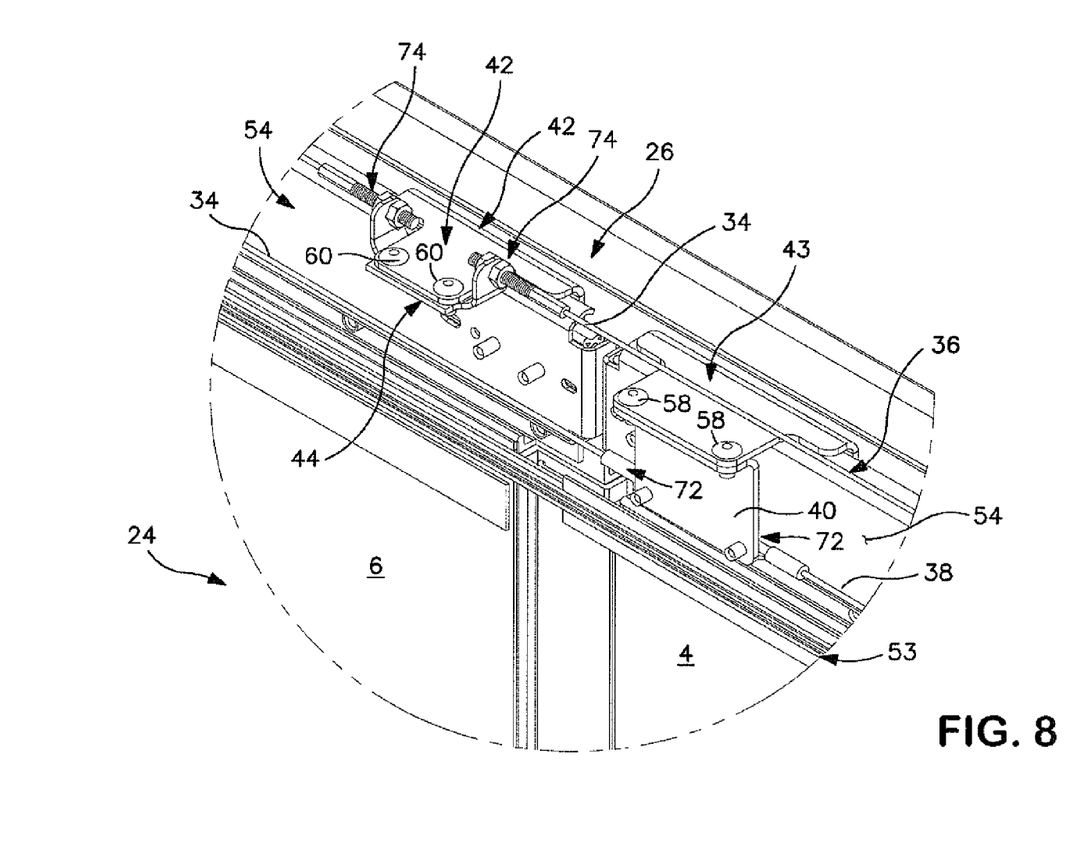
FIG. 8 is a perspective view of a bracket assembly portion of the sliding door assembly.
Figure 9:
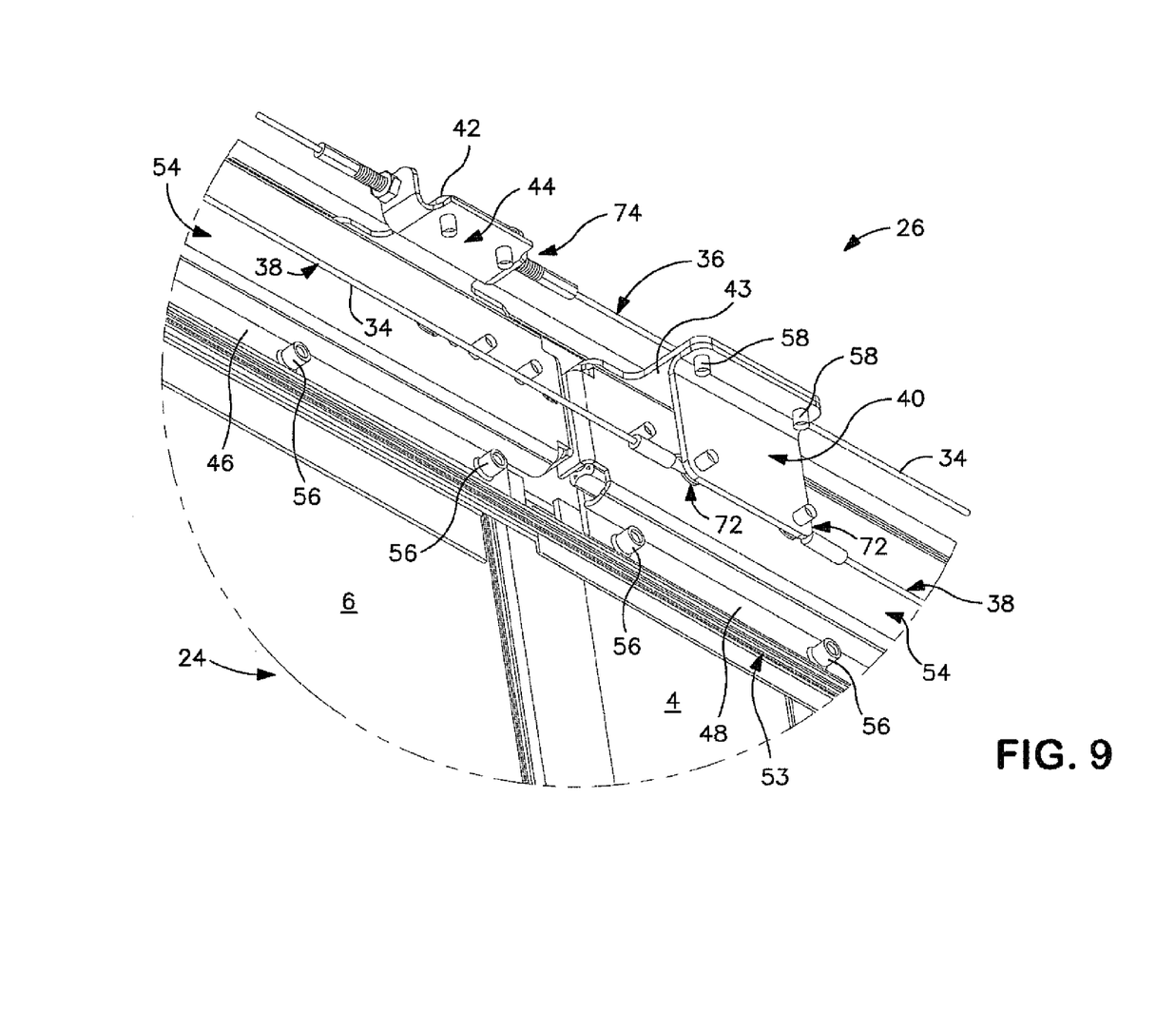
FIG. 9 is a reverse perspective view of the bracket assembly portion of FIG. 8.

Perspective and reversed-perspective views of bracket assembly 24 is shown in FIGS. 8 and 9, respectively. These views show the illustrative attachment of cables 34 with brackets 40 and 44. With regard to FIG. 8, bracket 44 is shown attached to bracket 42 via fasteners 60. The top cable portion 36 is shown attached to bracket 44 via attachments 74. In this embodiment the attachments 74 are illustratively bolts attached to threaded ends of the cables 34. As previously discussed, bracket 44 is configured to couple with door 6 such that as bracket 44 moves in a direction, so too does door 6.

Bracket 40 is shown attached to bracket 43 via fasteners 58. As shown, bracket 40 is configured to depend downward from bracket 43 and attach to the lower cable portion 38 of cables 34 via attachments 72. The illustrative attachments 72 are loops fastened to each side of bracket 40. This is in contrast with the bolted threaded ends of attachment 74. The threaded ends along with the bolts allow the tension of cables 34 to be tightened or loosened as desired to get the proper movement of the same. Tightening attachment 74 will make the cables more taut, where as loosening attachment 74 will add slack to the cables.

With respect to FIG. 8, this view shows how both brackets 40 and 44 attach to cables 34, but on opposite sides thereof. With the top cable portion 36 able to move above bracket 43 and bracket 42 able to move over lower cable portion 38, both brackets and, consequently, doors 6 and 4 are able to move in opposite directions via the cables without interfering with those cables. Also shown in this view is an illustrative seal 53 configured to assist preventing dirt and other contaminants from the exterior of the vehicle from migrating into the vehicle, and particularly, into the pulley assembly 26.

Figure 10:
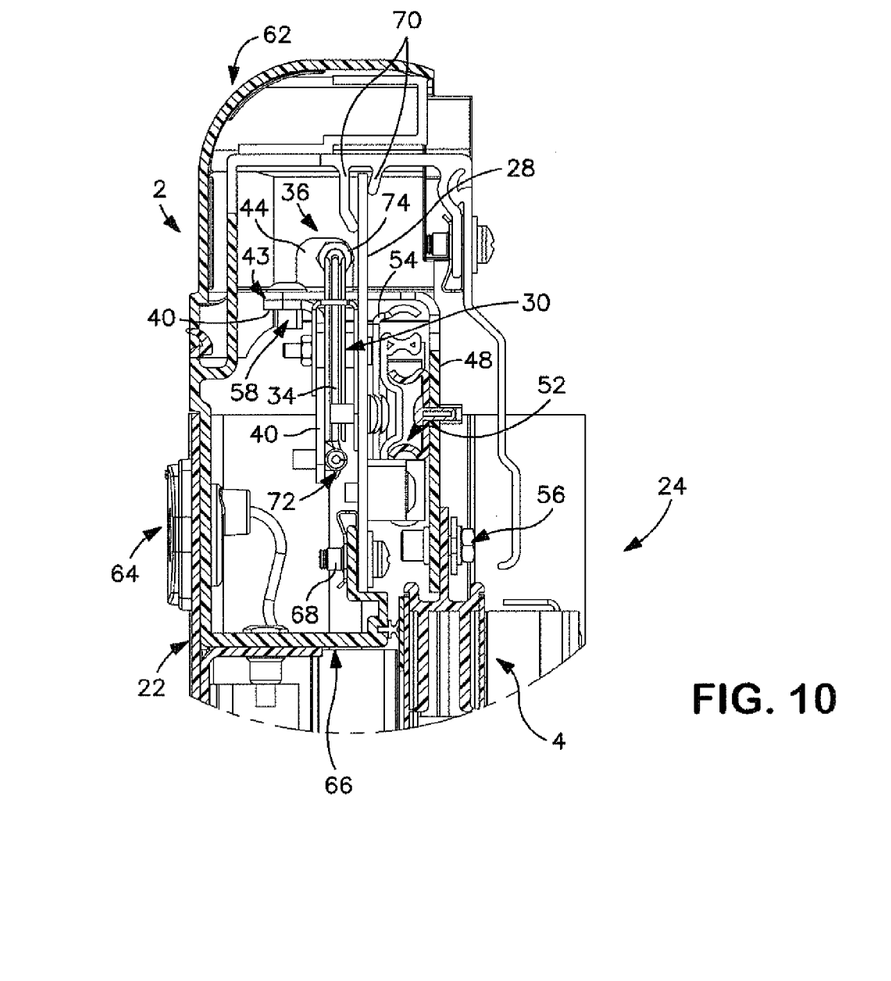
FIG. 10 is a side cross sectional view of a portion of the sliding door assembly coupled to the vehicle.

A cross-sectional view of vehicle 2 with sliding door assembly 24 is shown in FIG. 10. This view depicts, an illustrative, relative positioning between vehicle 2 and assembly 24. In an illustrative embodiment, vehicle 2 is shown comprising a ceiling portion 62 and rear wall 22. Illustratively, a light 64 extends from rear wall 22. Assembly 24 is attached to the vehicle via a rear structure header 66. Header 66 is configured to receive assembly 24, as well as attach to vehicle 2, as illustratively shown. Mounting bracket 28 is attached to header 66 via fasteners 68 and held in position by wall channel 70. It is appreciated that header 66 may extend at least a portion of the length of mounting bracket 28 to secure same to vehicle 2. Bracket track 54 is shown attached to mounting bracket 28, and illustratively facing the interior of vehicle 2. Second door rail 52 is shown engaging with track 54. It is appreciated in alternative embodiments, rollers or other bearings may be used to assist the sliding motion between track 54 and rail 52. Rail 52 is also shown attached to bracket 48 which itself is attached to door 4 via fasteners 56. (See, also, FIG. 7.) Bracket 43 is shown extending from bracket 48 and attached to bracket 40 which, in turn, is attached to cables 34 at attachment 72. Also shown is bracket 44 and its coupling to cables 34 at attachment 74. It is appreciated from this view, illustratively, that brackets 46 and 48 attach to brackets 44 and 40, respectively, adjacent the top cable portion 36.

Figure 11:
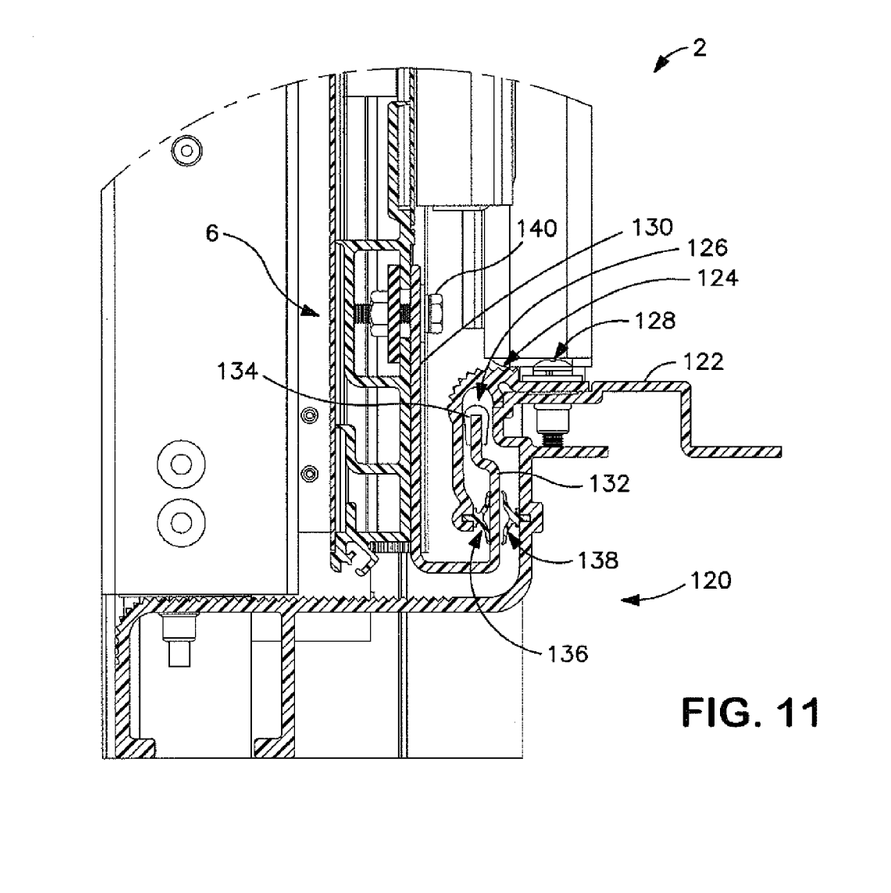
FIG. 11 is a side cross sectional view of the lower portion of the sliding door assembly coupled to the vehicle.
Figure 12:
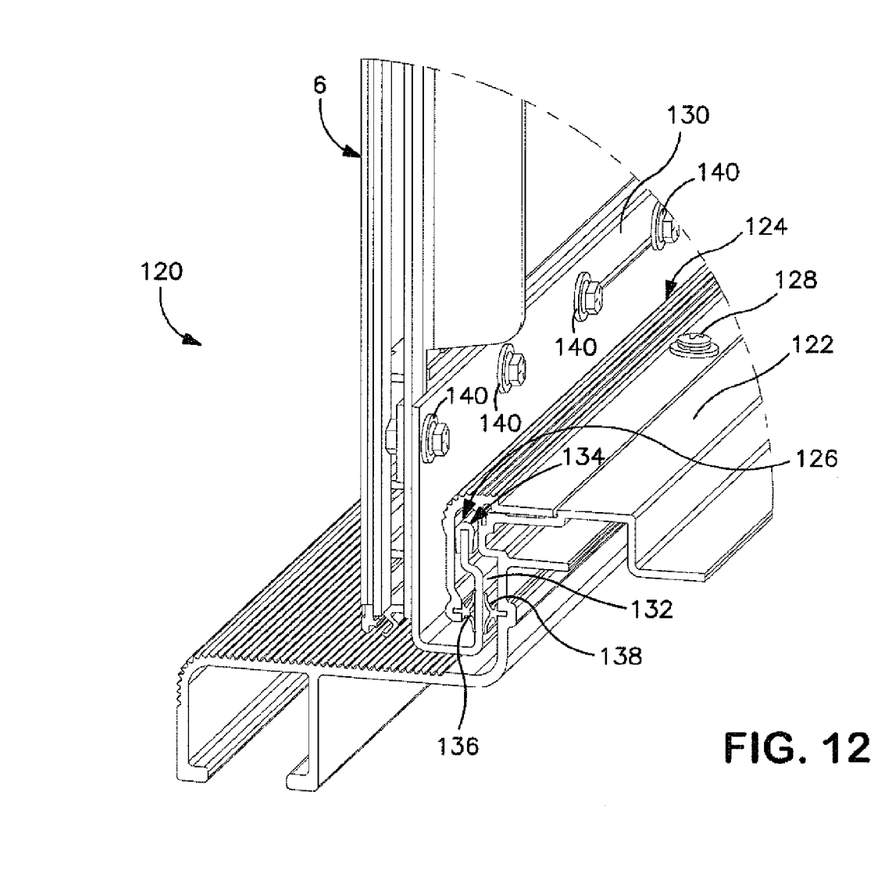
FIG. 12 is a partially cut-away perspective view of the lower portion of the sliding door assembly and vehicle of FIG. 11, as shown in the closed position.
Figure 13:
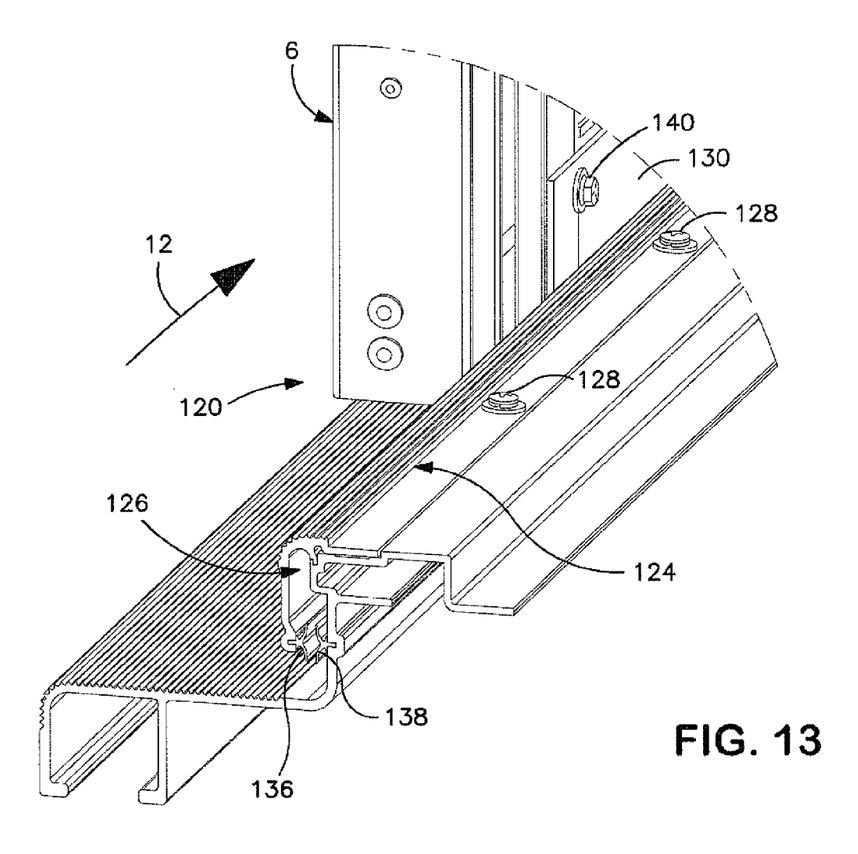
FIG. 13 is another partially cut-away perspective view of the lower portion of the sliding door assembly and vehicle of FIGS. 11 and 12, shown in the open position.

The lower portion of door 6 along with a lower guide assembly 120 is illustratively shown in FIGS. 11 through 13.

Illustratively, while doors 4 and 6 move along a rail at the upper portion thereof, they can also move along a lower guide assembly. For example, as shown in FIG. 11, adjacent floor 122 and at the end thereof, is a lower guide retainer 124 that provides a slot 126 between itself and the end of floor 122. Illustratively, retainer 124 is attached to floor 122 via fastener 128. Attached to door 6 is a lower door guide 130 which is illustratively "J" shaped, so that a first portion of the same may fasten to door 6, and a second portion may extend into slot 126. Portion 132 extending into slot 126 illustratively comprises a bearing 134, illustratively at the end thereof to provide enhanced movement through slot 126. Seals 136 and 138 are illustratively positioned at opposed sides of slot 126 and are configured to engage portion 132 of guide 130. The seals prevent contaminants from the exterior of vehicle 2 from migrating into the interior thereof. The seals also assist in preventing road and exterior noise from permeating through the vehicle.

A perspective view of assembly 120 is shown in FIG. 12. This view, in particular, shows how fasteners 140 attach lower door guide 130 to door 6. Also shown is bearing 134 and seal 138. This view also shows slot 126, and how portion 132 of door guide 130 is located within slot 126 for movement therein.

Another perspective view of assembly 120 is shown in FIG. 13. In this view, assembly 120 moves in direction 12. It is appreciated from this view how movement of assembly 120, attached to door 6, moves with respect to the confines of slot 126 in direction 12.

Although the present disclosure has been described with reference to particular means, materials, and embodiments, from the fore-going description, one skilled in the art can easily ascertain the essential characteristics of the present disclosure and various changes and modifications may be made to adapt the various uses and characteristics without departing from the spirit and scope of the present invention, as set forth in the following claims.

What is claimed is:

1. A vehicle comprising:
a door assembly located on vehicle which comprises:
a first door;
a second door;
wherein the first and second doors are movable between open and closed positions relative to the vehicle;
a door slide assembly coupled to the vehicle which comprises:
a traversing segments assembly that comprises a first segment and a second segment;
wherein the first and second segments are movable in first and second directions;
wherein the first door is coupled to the first segment and the second door is coupled to the second segment; and
wherein movement of the first door causes movement of the first segment in the first direction which causes movement of the second door in the second direction between open and closed positions; and
a lower guide assembly which comprises:
a lower guide having a slot longitudinally extending in the first and second directions and is located adjacent a flooring of the vehicle;
first and second door guides each having first and second portions;
wherein the first door guide is attached to a lower facing of the first door and the second door guide is attached to a lower facing of the second door;
wherein the second portion of each of the first and second door guides is disposed in the slot of the lower guide; and
wherein the first and second doors are spaced apart and suspended from the flooring.

2. The vehicle of claim 1, wherein movement of the first door causes movement of the first segment in the second direction which causes movement of the second door in the first direction.

3. The vehicle of claim 1, wherein door slide assembly further comprises first and second brackets, wherein the first bracket is coupled to the first door and the first segment of the traversing segment assembly, and wherein the second bracket is coupled to the second door and the second segment of the traversing segment member assembly.

4. The vehicle of claim 3, wherein movement in the first direction is axially opposite movement in the second direction such that when a force is applied to the first segment of the traversing segments assembly in the first direction, the second segment is moved in the axially opposite second direction.

5. The vehicle of claim 4, wherein the first segment of the traversing segments assembly is spaced apart from and movable substantially parallel to the second segment of the traversing segments assembly.

6. The vehicle of claim 1, wherein the traversing segment assembly comprises a cord having coupled ends and drawn about at least one pulley wheel wherein the cord comprises the first and second segments such that as the first segment moves in the first direction, the second segment is moved in the second direction.

7. The vehicle of claim 6, wherein as a first force is applied to the first door, it moves the first segment in the first direction which moves the second segment in the second direction moving both the first and second doors to an open position, and wherein a second force is applied to the first door, it moves the first segment in the second direction which moves the second segment in the first direction moving both the first and second doors to a closed position.

8. The vehicle of claim 1, wherein the first and second doors are each attached to a respective rail, and wherein each rail is movable along a longitudinally extending track.

* * * * *